(12) United States Patent
Misawa

(10) Patent No.: US 12,500,471 B2
(45) Date of Patent: Dec. 16, 2025

(54) DIRECT-CURRENT MOTOR

(71) Applicant: DENSO CORPORATION, Kariya (JP)

(72) Inventor: Toshiki Misawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 230 days.

(21) Appl. No.: 18/495,665

(22) Filed: Oct. 26, 2023

(65) Prior Publication Data

US 2024/0055927 A1    Feb. 15, 2024

Related U.S. Application Data

(63) Continuation of application No. PCT/JP2022/015116, filed on Mar. 28, 2022.

(30) Foreign Application Priority Data

Apr. 28, 2021   (JP) .................................. 2021-075818

(51) Int. Cl.
| | | |
|---|---|---|
| *H02K 5/14* | (2006.01) | |
| *B60T 13/74* | (2006.01) | |
| *H01R 39/20* | (2006.01) | |
| *H01R 39/38* | (2006.01) | |

(52) U.S. Cl.
CPC .............. *H02K 5/148* (2013.01); *B60T 13/74* (2013.01); *H01R 39/20* (2013.01); *H01R 39/38* (2013.01)

(58) Field of Classification Search
CPC .......... H02K 5/14; H02K 5/143; H02K 5/148; H02K 2213/03; H02K 23/30; B60T 13/74; H01R 39/20; H01R 39/38
See application file for complete search history.

(56) References Cited

U.S. PATENT DOCUMENTS

2009/0058210 A1* 3/2009 Qin .................. H02K 23/30
                                                310/179
2021/0184523 A1* 6/2021 Valin .................... H02K 1/2766

FOREIGN PATENT DOCUMENTS

JP         2017-158359 A     9/2017
WO     WO-2018084108 A1 *  5/2018    .............. F01L 1/352

OTHER PUBLICATIONS

English translation of WO-2018084108-A1 (Year: 2018).*

* cited by examiner

*Primary Examiner* — Tulsidas C Patel
*Assistant Examiner* — Joshua Kiel M Rodriguez
(74) *Attorney, Agent, or Firm* — Maschoff Brennan

(57) ABSTRACT

A first line, which extends through a circumferential center of a tooth, and a second line, which extends through a circumferential center of an undercut between two segments adjacent to the tooth, intersect at an angle C. A third line, which extends through a magnetic-flux-free region of a magnet, and a fourth line, which extends through a circumferential center of a power supply brush, intersect at an angle D. The third line and a fifth line, which extends through a circumferential center of one of magnetic poles of the magnet, intersect at an angle E. A reference line of a stator and a sixth line, which extends through a reference point of a brush holder, intersect at an angle F. A shift angle S, which is obtained by C+D−E+F, is set such that a phase difference between an armature torque and a cogging torque is 180°±80°.

5 Claims, 7 Drawing Sheets

DIRECT-CURRENT MOTOR

CROSS REFERENCE TO RELATED APPLICATIONS

This application is a continuation application of International Patent Application No. PCT/JP2022/015116 filed on Mar. 28, 2022, which designated the U.S. and claims the benefit of priority from Japanese Patent Application No. 2021-075818 filed on Apr. 28, 2021. The entire disclosures of all of the above applications are incorporated herein by reference.

TECHNICAL FIELD

The present disclosure relates to a direct-current motor.

BACKGROUND

For example, vehicles are equipped with control brakes such as ABS (anti-lock braking system), and a direct-current motor is used as a drive source of the ABS. One previously proposed direct-current motor, which is used as the drive source of the ABS, includes: an armature and a commutator installed to a shaft; and a plurality of power supply brushes configured to slide along a plurality of segments of the commutator. When a deviation in the timing of commutation occurs among the power supply brushes, an imbalance in a magnetic field is generated at coils of the armature, resulting in vibration and noise during rotation of the direct-current motor.

SUMMARY

This section provides a general summary of the disclosure, and is not a comprehensive disclosure of its full scope or all of its features.

According to the present disclosure, there is provided a direct-current motor that includes a rotor, a stator and a brush holder. The rotor includes a shaft, an armature core and a commutator. The armature core has: a plurality of teeth, which are arranged in a circumferential direction about a central axis of the shaft; and a plurality of slots, each of which is formed between corresponding adjacent two of the plurality of teeth. The commutator has a plurality of segments which are placed adjacent to the armature core and are arranged in the circumferential direction about the central axis. The stator includes a plurality of field magnets which are arranged in the circumferential direction about the central axis. The plurality of field magnets form a plurality of magnetic poles, and each of the plurality of field magnets has corresponding two or more magnetic poles among the plurality of magnetic poles. The brush holder holds a plurality of power supply brushes which are arranged in the circumferential direction about the central axis. Each of the plurality of power supply brushes is configured to contact the plurality of segments. A relationship between a number A of the plurality of slots and a number B of the plurality of magnetic poles is $A = n \times B$ where n is a natural number.

A first imaginary line, which radially extends about the central axis through a circumferential center of one of the plurality of teeth, and a second imaginary line, which radially extends about the central axis through a circumferential center of an undercut located between corresponding adjacent two of the plurality of segments placed adjacent to the one of the plurality of teeth, intersect each other at an angle C. A third imaginary line, which radially extends about the central axis through a magnetic-flux-free region of one of the plurality of field magnets, and a fourth imaginary line, which radially extends about the central axis through a circumferential center of one of the plurality of power supply brushes placed adjacent to the third imaginary line, intersect each other at an angle D. The third imaginary line and a fifth imaginary line, which radially extends about the central axis through a circumferential center of one of the corresponding two or more magnetic poles of the one of the plurality of field magnets, intersect each other at an angle E. A reference line of the stator, which radially extends about the central axis, and a sixth imaginary line, which radially extends about the central axis through a reference point of an assembling position of the brush holder for assembling the brush holder to the stator, intersect each other at an angle F. A shift angle S, which is obtained by the angle C+the angle D−the angle E+the angle F, is set to result in that a phase difference between an armature torque and a cogging torque is in a range of $180° \pm 80°$.

BRIEF DESCRIPTION OF DRAWINGS

The drawings described herein are for illustrative purposes only of selected embodiments and not all possible implementations, and are not intended to limit the scope of the present disclosure.

DETAILED DESCRIPTION

Figure 1:
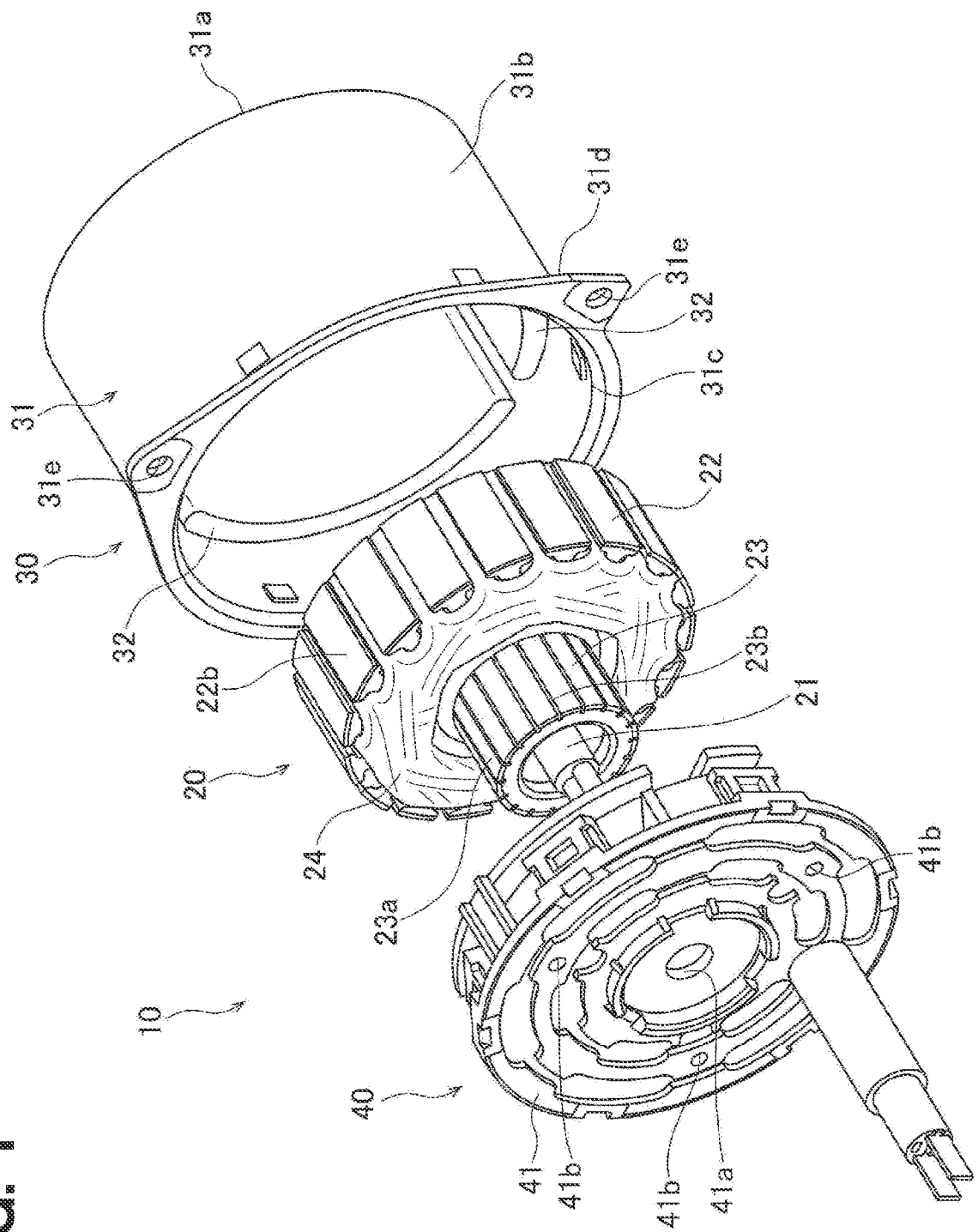
FIG. 1 is an exploded perspective view schematically showing a structure of a direct-current motor according to an embodiment of the present disclosure.

For example, vehicles are equipped with control brakes such as ABS (anti-lock braking system), and a direct-current motor is used as a drive source of the ABS. One previously proposed direct-current motor, which is used as the drive source of the ABS, includes: an armature and a commutator installed to a shaft; and a plurality of power supply brushes configured to slide along a plurality of segments of the commutator. When a deviation in the timing of commutation occurs among the power supply brushes, an imbalance in a magnetic field is generated at coils of the armature, resulting in vibration and noise during rotation of the direct-current motor.

At the direct-current motor described above, the resonance of the armature is reduced by improving the winding balance of the windings, which form the coils of the armature, in order to reduce the vibration and the noise at the direct-current motor. However, as the drive source of vehicle has shifted from an internal combustion engine to an electric motor in recent years, there is a growing demand for reducing vibration and noise of components of the vehicle to improve passenger comfort. Therefore, it is necessary to achieve even smaller vibration and noise for the direct-current motor installed at the vehicle.

According to the present disclosure, there is provided a direct-current motor including:
a rotor that includes:
  a shaft;
  an armature core that has: a plurality of teeth, which are arranged in a circumferential direction about a central axis of the shaft; and a plurality of slots, each of which is formed between corresponding adjacent two of the plurality of teeth; and
  a commutator that has a plurality of segments which are placed adjacent to the armature core and are arranged in the circumferential direction about the central axis;
a stator that includes a plurality of field magnets which are arranged in the circumferential direction about the central axis, wherein the plurality of field magnets form a plurality of magnetic poles, and each of the plurality of field magnets has corresponding two or more magnetic poles among the plurality of magnetic poles; and
a brush holder that holds a plurality of power supply brushes which are arranged in the circumferential direction about the central axis, wherein each of the plurality of power supply brushes is configured to contact the plurality of segments, wherein:
a relationship between a number A of the plurality of slots and a number B of the plurality of magnetic poles is A=n×B where n is a natural number; and
in a view taken from an output side of the shaft, with reference to the central axis, the direct-current motor is configured as follows:
a first imaginary line, which radially extends about the central axis through a circumferential center of one of the plurality of teeth, and a second imaginary line, which radially extends about the central axis through a circumferential center of an undercut located between corresponding adjacent two of the plurality of segments placed adjacent to the one of the plurality of teeth, intersect each other at an angle C;
a third imaginary line, which radially extends about the central axis through a magnetic-flux-free region of one of the plurality of field magnets, and a fourth imaginary line, which radially extends about the central axis through a circumferential center of one of the plurality of power supply brushes placed adjacent to the third imaginary line, intersect each other at an angle D;
the third imaginary line and a fifth imaginary line, which radially extends about the central axis through a circumferential center of one of the corresponding two or more magnetic poles of the one of the plurality of field magnets, intersect each other at an angle E;
a reference line of the stator, which radially extends about the central axis, and a sixth imaginary line, which radially extends about the central axis through a reference point of an assembling position of the brush holder for assembling the brush holder to the stator, intersect each other at an angle F; and
a shift angle S, which is obtained by the angle C+the angle D−the angle E+the angle F, is set to result in that a phase difference between an armature torque and a cogging torque is in a range of 180°±80°.

At the direct-current motor described above, the timing of commutation can be adjusted among the power supply brushes by adjusting the shift angle S that is obtained based on the composite of the angles C, D, E, F, which relate to the phase of the armature torque and the phase of the cogging torque. According to the verification performed by the inventor of the present application, by taking the output characteristic of the direct-current motor also into consideration, it is confirmed that when the shift angle S is set such that the phase difference between the armature torque and the cogging torque is in a range of 180°±80°, the vibration and the noise of the direct-current motor can be reduced more than ever. It is further preferred that the shift angle S is adjusted such that the phase difference is in a range of 180°±60°.

At the direct-current motor of the present disclosure, it is desirable that the angle C is in a range of 0°±3°; the angle D is in a range of 30°±3°; the angle E is in a range of 30°±3°; the angle F is in a range of 0°±3°; and the shift angle S is in a range of 0°±3°. In a case where the number B of the plurality of magnetic poles is six, and the natural number n is three, it is desirable that each of a plurality of windings is wound around each corresponding set of three teeth among the plurality of teeth at equal intervals of 120° and thereby forms three coils. The direct-current motor of the present disclosure is used at a control brake.

According to the present disclosure, there is provided the direct-current motor that can reduce the vibration and the noise more than ever before.

Hereinafter, an embodiment of the present disclosure will be described with reference to the accompanying drawings. In order to facilitate understanding of the description, the same components are indicated by the same reference signs as much as possible in each drawing, and redundant descriptions are omitted.

FIG. 1 is an exploded perspective view schematically showing a structure of a direct-current motor 10 of the present embodiment. The direct-current motor 10 is a direct-current motor that is incorporated into a drive source of a control brake, such as an ABS (anti-lock braking system). Specifically, a rotational drive force, which is generated through rotation of the direct-current motor 10, is converted into a linear reciprocating motion of a piston of an oil pump (not shown) to control an oil pressure, so that a braking force of a brake disc (not shown) is controlled.

The direct-current motor 10 includes a rotor 20, a stator 30 and a brush device 40. The rotor 20 includes: a shaft 21 which functions as an output shaft; an armature core 22 which is fixed to the shaft 21; a commutator 23 which is placed adjacent to an output side of the shaft 21 and is fixed to the shaft 21; and a plurality of windings 24 which are wound on the armature core 22. An end portion (i.e., the output side) of the shaft 21 projects from the brush device 40 to the outside of the direct-current motor 10 and is coupled to the driven device (not shown). Thereby, the shaft 21 transmits the rotational drive force to the driven device.

Figure 2:
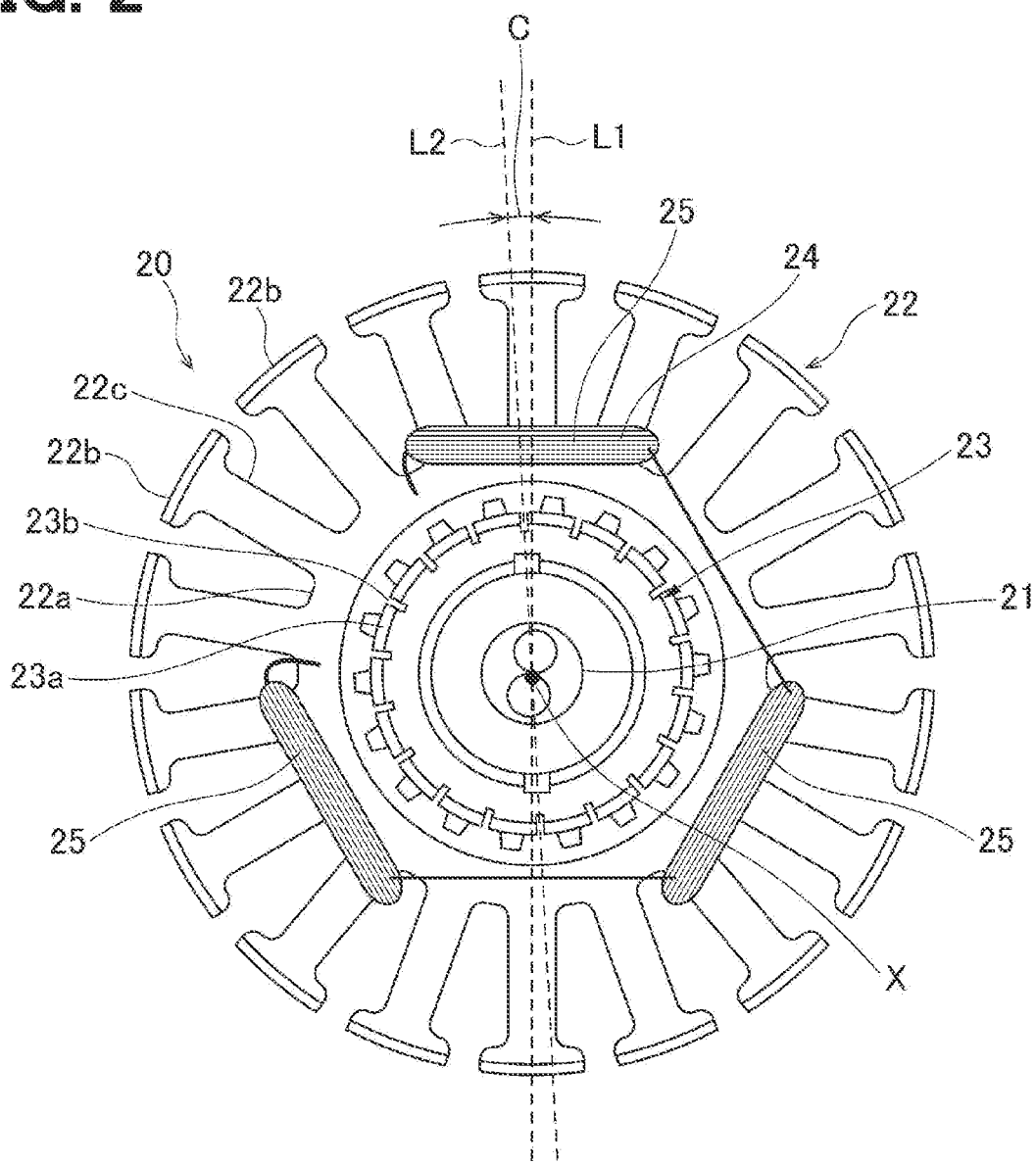
FIG. 2 is a side view of a rotor viewed from an output side of a shaft.

FIG. 2 is a side view of the rotor 20 viewed from the output side of the shaft 21. In FIG. 2, only one of the windings 24 is indicated for the sake of easy understanding. With reference to FIGS. 1 and 2, the armature core 22 includes: an annular portion 22a which is shaped in a cylindrical tubular form and is securely press-fitted to the shaft 21; and a plurality of teeth 22b which radially outwardly project from an outer peripheral surface of the annular portion 22a. A plurality of slots 22c are formed at the armature core 22 such that each of the slots 22c is formed between corresponding adjacent two of the teeth 22b. The armature core 22 is made of a magnetic material.

The teeth 22b are arranged at equal intervals in a circumferential direction about a central axis X of the shaft 21. In a view taken from the output side of the shaft 21, each of the teeth 22b is shaped into a T-shape. According to the present embodiment, in the armature core 22, the number of the teeth 22b is eighteen, and these eighteen teeth 22b are arranged at 20° intervals in the circumferential direction about the central axis X. Therefore, the number of the slots 22c is eighteen, and these eighteen slots 22c are arranged at equal intervals in the circumferential direction about the central axis X and are formed at the outer peripheral surface of the armature core 22.

The plurality of windings 24 are wound on the armature core 22 by distributed winding. Here, each of the plurality of windings 24 is wound around each corresponding set of three teeth 22b among the plurality of teeth 22b at equal intervals of 120° and thereby forms three coils 25. Specifically, as shown in FIG. 2, one winding 24 is wound a plurality of times around a corresponding first set of three teeth 22b among the plurality of teeth 22b to form a first coil 25. This winding 24 is then wound a plurality of times around a corresponding second set of three teeth 22b, which are spaced from the first set of three teeth 22b by 120° in the circumferential direction about the central axis X to form a second coil 25. This winding 24 is further wound a plurality of times around a corresponding third set of three teeth 22b, which are spaced from the second set of three teeth 22b by 120° in the circumferential direction about the central axis X to form a third coil 25.

In the present embodiment, since the armature core 22 has the eighteen teeth 22b, the creation of the three coils 25 by each corresponding one of the windings 24 is repeated eighteen times while shifting the set of three teeth 22b in the circumferential direction. That is, more coils 25 are stacked on top of the already formed coils 25. Thus, at the armature core 22, the total number of the coils 25 is fifty-four (i.e., 3×18=54). Although not depicted in the drawings, each of two ends of each winding 24 is electrically connected to a corresponding one of a plurality of segments 23a of the commutator 23.

The commutator 23 is securely press-fitted to the shaft 21, and thereby the commutator 23 is fixed to the shaft 21. The commutator 23 has the plurality of segments (commutator segments) 23a arranged at equal intervals in the circumferential direction about the central axis X. The number of the segments 23a is eighteen that corresponds to the number of the teeth 22b and the number of the slots 22c. Each adjacent two of the segments 23a are electrically insulated from each other, and an undercut 23b, which is a groove, is formed between the adjacent two of the segments 23a. Although not depicted in the drawings, each of the segments 23a is electrically connected with the corresponding end of the corresponding one of the windings 24.

Figure 3:
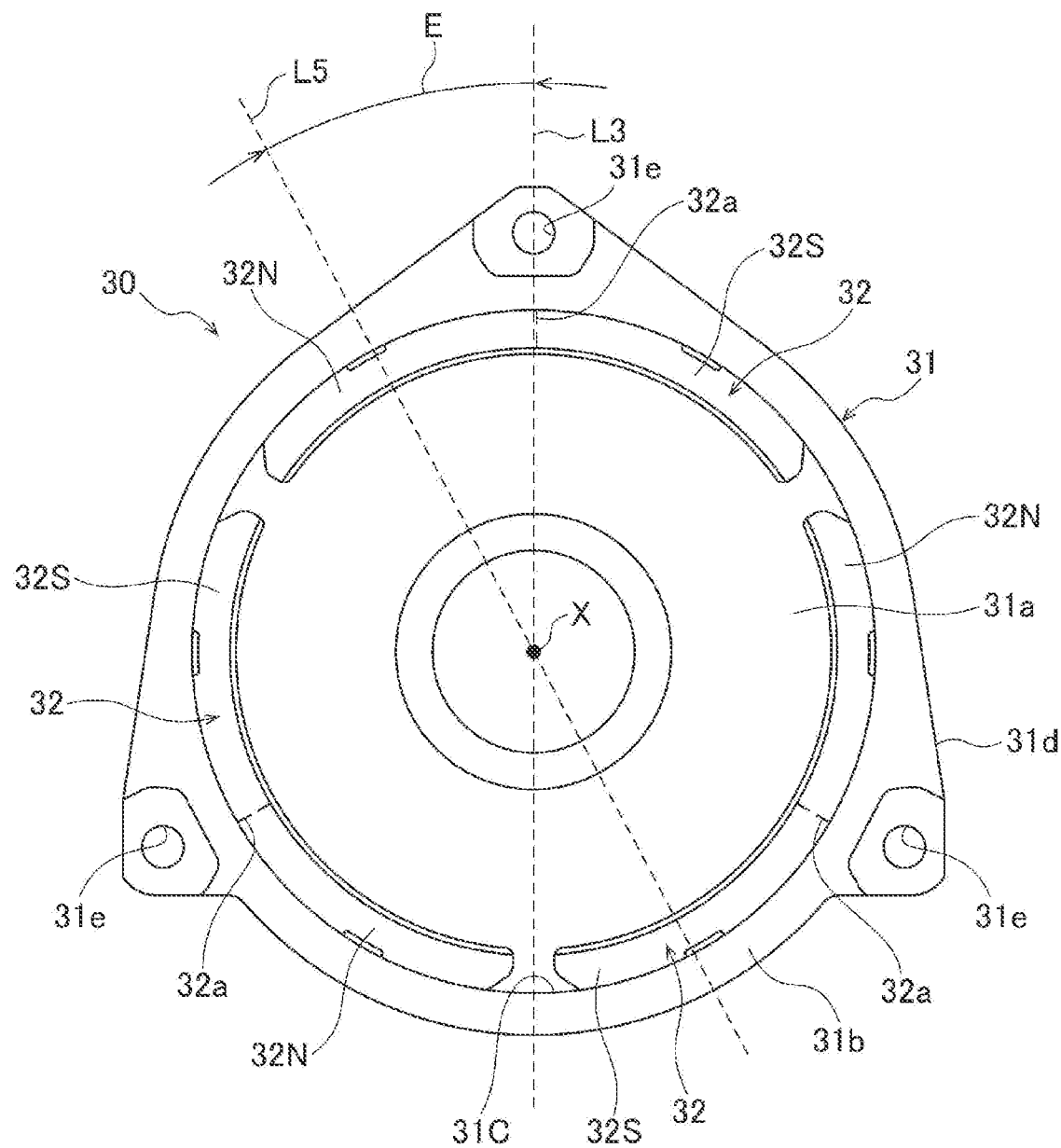
FIG. 3 is a side view of a stator viewed from the output side of the shaft.

FIG. 3 is a side view of the stator 30 viewed from the output side of the shaft 21. In FIG. 3, indication of the rotor 20 and the brush device 40 is omitted. With reference to FIGS. 1 and 3, the stator 30 includes a yoke housing 31.

The yoke housing 31 has: a bottom 31a which is shaped in a circular form; a peripheral wall 31b which is shaped in a cylindrical tubular form and extends from an outer peripheral edge of the bottom 31a; an opening 31c of the peripheral wall 31b which is opposite to the bottom 31a; and a flange 31d which is perpendicular to the peripheral wall 31b and extends outward from an outer peripheral edge of the opening 31c. The rotor 20 is received at an inside of the yoke housing 31, and a bearing member (not shown), which rotatably supports one end portion of the shaft 21 of the rotor 20, is installed at the bottom 31a. A central axis of the peripheral wall 31b, which is shaped in the cylindrical tubular form, coincides with the central axis X of the shaft 21. The brush device 40 is installed to the opening 31c.

A plurality of field magnets 32 are fixed to an inner peripheral surface of the peripheral wall 31b. In the present embodiment, the number of the field magnets 32 is three, and these three field magnets 32 are curved along the inner peripheral surface of the peripheral wall 31b and are arranged at equal intervals of 120° in the circumferential direction. Each field magnet 32 is a one-piece magnet that forms a magnetic-flux-free region (a neutral region that is not magnetized to have a magnetic polarity) 32a, and the magnetic-flux-free region 32a is formed at a circumferential center of the field magnet 32 in the circumferential direction about the central axis X of the shaft 21. Furthermore, each field magnet 32 has a plurality of magnetic poles. Specifically, each field magnet 32 has one N-pole magnet (N-magnetic pole) 32N and one S-pole magnet (S-magnetic pole) 32S placed on two circumferentially opposite sides, respectively, of the magnetic-flux-free region 32a. Alternatively, each field magnet 32 may be a field magnet that has the N-pole magnet 32N and the S-pole magnet 32S which are formed separately.

Each field magnet 32 is placed on the radially outer side of the teeth 22b and are opposed to the teeth 22b. An electromagnetic force is generated at the armature core 22 based on the electric current conducted through the coils 25, and this electromagnetic force becomes the torque that rotates the rotor 20. In the direct-current motor 10 of the present embodiment, the three field magnets 32 form the six magnetic poles, so that the direct-current motor 10 has the six magnetic poles. That is, when a natural number n is 3, a relationship between the number (A) of the slots 22c and the number (B) of the magnetic poles is (A)=n×(B), which results in 18=3×6.

Returning to FIG. 1, the brush device 40 has a brush holder 41 that is installed to an inside of the opening 31c of the yoke housing 31 by, for example, press-fitting to close the opening 31c. The brush holder 41 has an opening 41a which receives the other end portion (the output side) of the shaft 21 of the rotor 20. A bearing member (not shown), which rotatably supports the other end portion of the shaft 21, is installed at an inside of the opening 41a.

Figure 4:
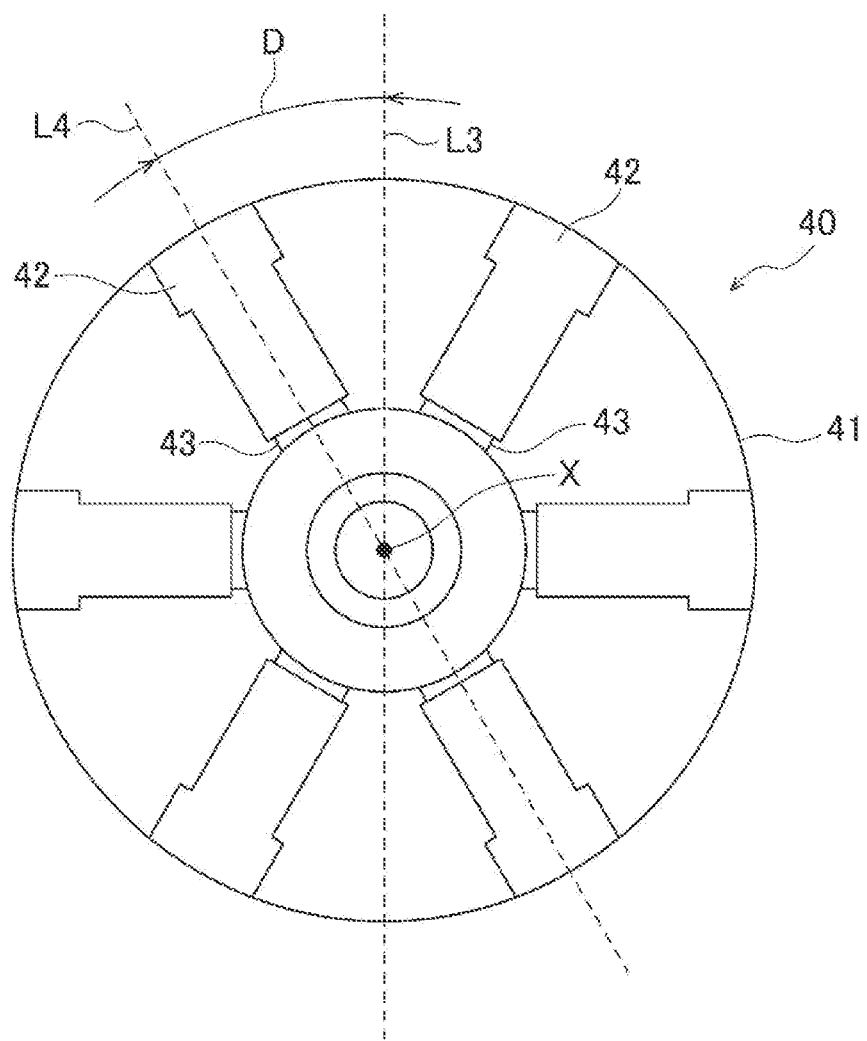
FIG. 4 is a side view of a brush holder viewed from a side that is opposite to the output side of the shaft.

FIG. 4 is a side view of the brush holder 41 viewed from a side that is opposite to the output side of the shaft 21. In FIG. 4, indication of the rotor 20 is omitted. With reference to FIGS. 1 and 4, a plurality of brush boxes 42 are held by an inner surface of the brush holder 41, and a corresponding one of a plurality of power supply brushes 43 is supported at each of the brush holders 41. In the present embodiment, the number of the brush boxes 42 is six, and these six brush boxes 42 and the six power supply brushes 43 respectively received in the brush boxes 42 are arranged at equal intervals (60° intervals) in the circumferential direction about the central axis X of the shaft 21. With reference to FIGS. 3 and 4, each of the power supply brushes 43 is placed at a circumferential center, i.e., a magnetic pole center of a corresponding one of the N-pole magnet 32N and the S-pole magnet 32S of a corresponding one of the field magnets 32.

Each power supply brush 43 is a sintered body made from a material that mainly includes graphite powder and copper powder, and each power supply brush 43 is connected to a power supply member (not shown) installed to the corresponding brush holder 41. Thereby, the electric current is supplied from an external power source to each power supply brush 43 through the corresponding power supply member. The brush holder 41 and the brush boxes 42 are made of a dielectric material, such as a dielectric resin material.

Each power supply brush 43 is placed on a radially outer side of the segments 23a of the commutator 23 and is urged against the segments 23a to contact the segments 23a in the radial direction of the direct-current motor 10 by, for example, a coil spring (not shown) which is received in the corresponding brush box 42 in a manner that allows reciprocation of the power supply brush 43. Each power supply brush 43 is slid along the segments 23a in response to the rotation of the rotor 20, so that the power supply brush 43 can supply the electric current to the corresponding winding 24, i.e., the corresponding coil 25 electrically connected to the corresponding segment 23a.

Figure 5:
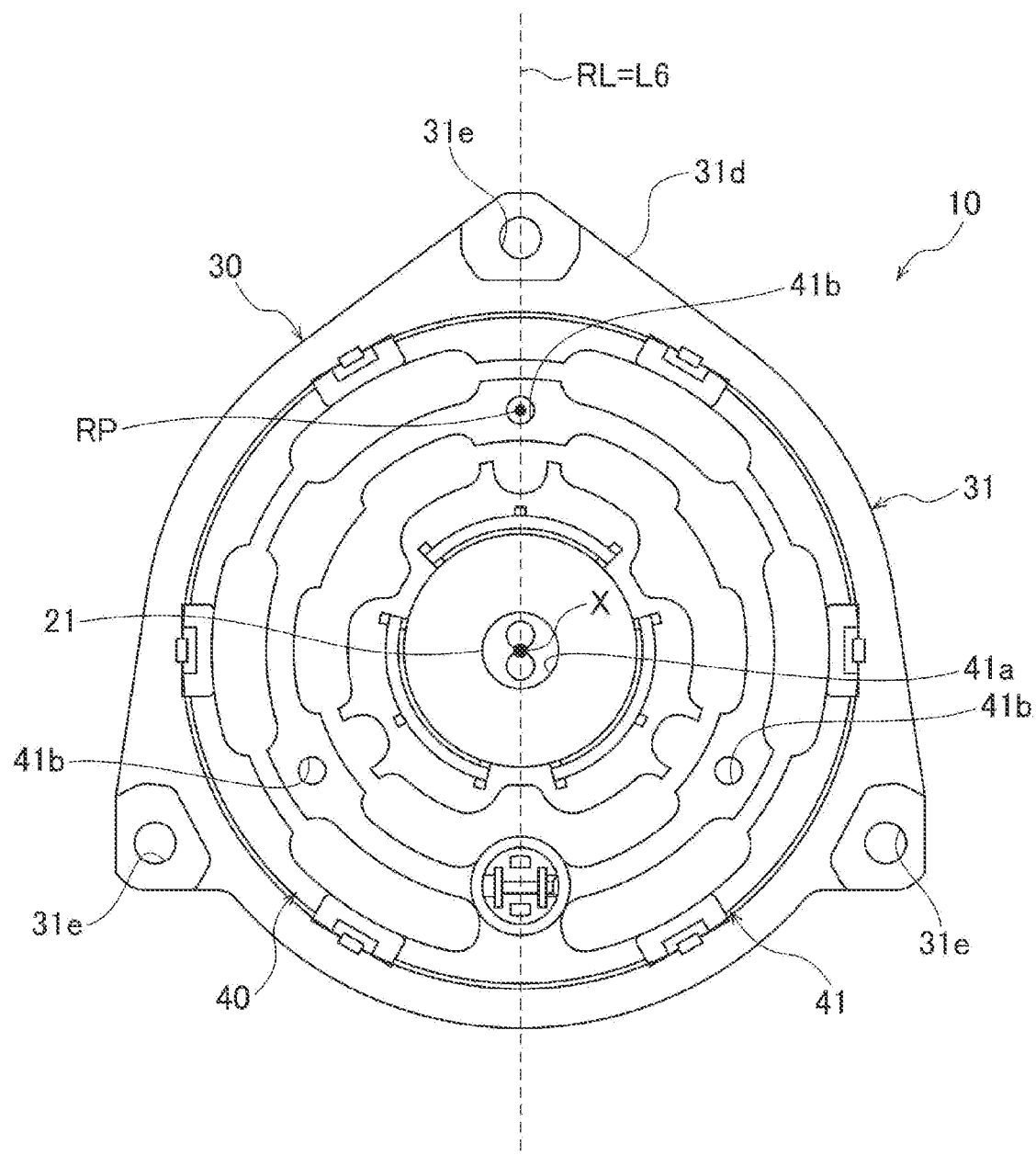
FIG. 5 is a side view of the direct-current motor viewed from the output side of the shaft.

FIG. 5 is a side view of the direct-current motor 10 viewed from the output side of the shaft 21. With reference to FIGS. 1 and 5, a reference line RL, which radially extends through the central axis X of the shaft 21, is defined at the yoke housing 31. The reference line RL is a line that radially extends through a center of one of three openings 31e formed at the flange 31d of the yoke housing 31. The three openings 31e are arranged at equal intervals of 120° in the circumferential direction about the central axis X. In the present embodiment, the reference line RL coincides with the magnetic-flux-free region 32a of a corresponding one of the field magnets 32 installed at the inside of the yoke housing 31.

Three blind holes 41b are formed at an outer surface of the brush holder 41, and these three blind holes 41b are arranged at equal intervals of 120° in the circumferential direction about the central axis X. A center of one of the blind holes 41b functions as a reference point RP of an assembling position of the brush holder 41 (i.e., the brush device 40) at the time of assembling the brush holder 41 (i.e., the brush device 40) to the yoke housing 31. Specifically, the assembling position of the brush holder 41 relative to the yoke housing 31 in the circumferential direction about the central axis X is defined by adjusting the position of the reference line RL of the yoke housing 31 and the position of the reference point RP of the brush holder 1.

Now, torque fluctuations of the direct-current motor, which are generated due to the structure of the direct-current motor in general, will be described. Factors, which cause the torque fluctuations, include: armature torque which is generated according to an electromagnetic force generated at the armature core 22 at the time of energizing the coils 25; and cogging torque which is generated under an influence of magnetic field lines applied from the field magnets 32 to the armature core 22. The armature torque and the cogging torque change depending on the rotational position of the rotor 20. Specifically, a change in a magnitude of each of the armature torque and the cogging torque in response to the rotational angle is expressed by a smooth sine curve.

The sum of the armature torque and the cogging torque is so called the torque ripple. Therefore, when a phase of the sine curve of the armature torque coincides with a phase of the sine curve of the cogging torque, the torque ripple increases, resulting in increased vibration and noise of the direct-current motor. The present disclosure reduces the torque ripple and thereby reduces the vibration and the noise of the direct-current motor 10 by adjusting the phases of the armature torque and the phase of the cogging torque, i.e., by shifting and offsetting the phase of the armature torque and the phase of the cogging torque relative to each other.

In an attempt to reduce the torque ripple, the inventor of the present application has focused on adjusting the timing of commutation among the plurality of power supply brushes 43 by adjusting a shift angle S, which is obtained based on a composite of the following angles which relate to the phase of the armature torque and the phase of the cogging torque.

As a first angle among the above-described angles, with reference to FIG. 2, in a view taken from the output side of the shaft 21, with reference to the central axis X, a first imaginary line (first line) L1, which radially extends about the central axis X through a circumferential center of one of the teeth 22b of the armature core 22, and a second imaginary line (second line) L2, which radially extends about the central axis X through a circumferential center (i.e., a circumferential center of the undercut 23b) between corresponding adjacent two of the segments 23a placed adjacent to the one of the teeth 22b, intersect each other at an angle C. A size of this angle C is adjusted in a range of 0°±3° to account for tolerances.

As a second angle among the above-described angles, with reference to FIG. 4, in the view taken from the output side of the shaft 21, with reference to the central axis X, a third imaginary line (third line) L3, which radially extends about the central axis X through the magnetic-flux-free region 32a of one of the field magnets 32, and a fourth imaginary line (fourth line) L4, which radially extends about the central axis X through a circumferential center of one of the power supply brushes 43 (e.g., a circumferential center of the power supply brush 43 which corresponds to the N-pole magnet 32N) placed adjacent to the third imaginary line L3, intersect each other at an angle D (FIG. 4 indicates the angle D viewed from the opposite side that is opposite to the output side of the shaft 21). A size of this angle D is adjusted in a range of 30°±3° to account for tolerances. The fourth imaginary line L4 may be defined by a line, which extends through a circumferential center of the brush box 42 instead of the power supply brush 43 described above.

As a third angle among the above-described angles, with reference to FIG. 3, in the view taken from the output side of the shaft 21, with reference to the central axis X, the third imaginary line L3, which radially extends about the central axis X through the magnetic-flux-free region 32a of the one of the field magnets 32, and a fifth imaginary line (fifth line) L5, which radially extends about the central axis X through a circumferential center of one of the two magnetic poles of the one of the plurality of field magnets 32 placed adjacent to the third imaginary line L3 (e.g., the circumferential center, i.e., a magnetic pole center of the N-pole magnet 32N described above with reference to the angle D), intersect each other at an angle E. A size of this angle E is adjusted in a range of 30°±3° to account for tolerances.

As a fourth angle among the above-described angles, with reference to FIG. 5, in the view taken from the output side of the shaft 21, with reference to the central axis X, the reference line RL of the stator 30 (i.e., the reference line RL of the yoke housing 31), which radially extends about the central axis X, and a sixth imaginary line L6, which radially extends about the central axis X through the reference point RP of the assembling position of the brush holder 41 for assembling the brush holder 41 to the stator 30 (i.e., the yoke housing 31), intersect each other at an angle F. In FIG. 5, this angle F is set to 0°, so that the reference line RL and the sixth imaginary line L6 coincide with each other. A size of this angle F is adjusted in a range of 0°±3° to account for tolerances.

In the present embodiment, the shift angle S, which is set and is obtained by the angle C+the angle D−the angle E+the angle F, is set to adjust the timing of commutation. In order to set the shift angle S, the inventor has carried out analytical simulation to verify the shift angle S. The analytical simulation is carried out to check a relationship between the shift angle S and the torque ripple (the armature torque and the cogging torque) when the rotor 20 is rotated at a no-load frequency of 1500 rpm at the direct-current motor 10 of the present embodiment.

Figure 6:
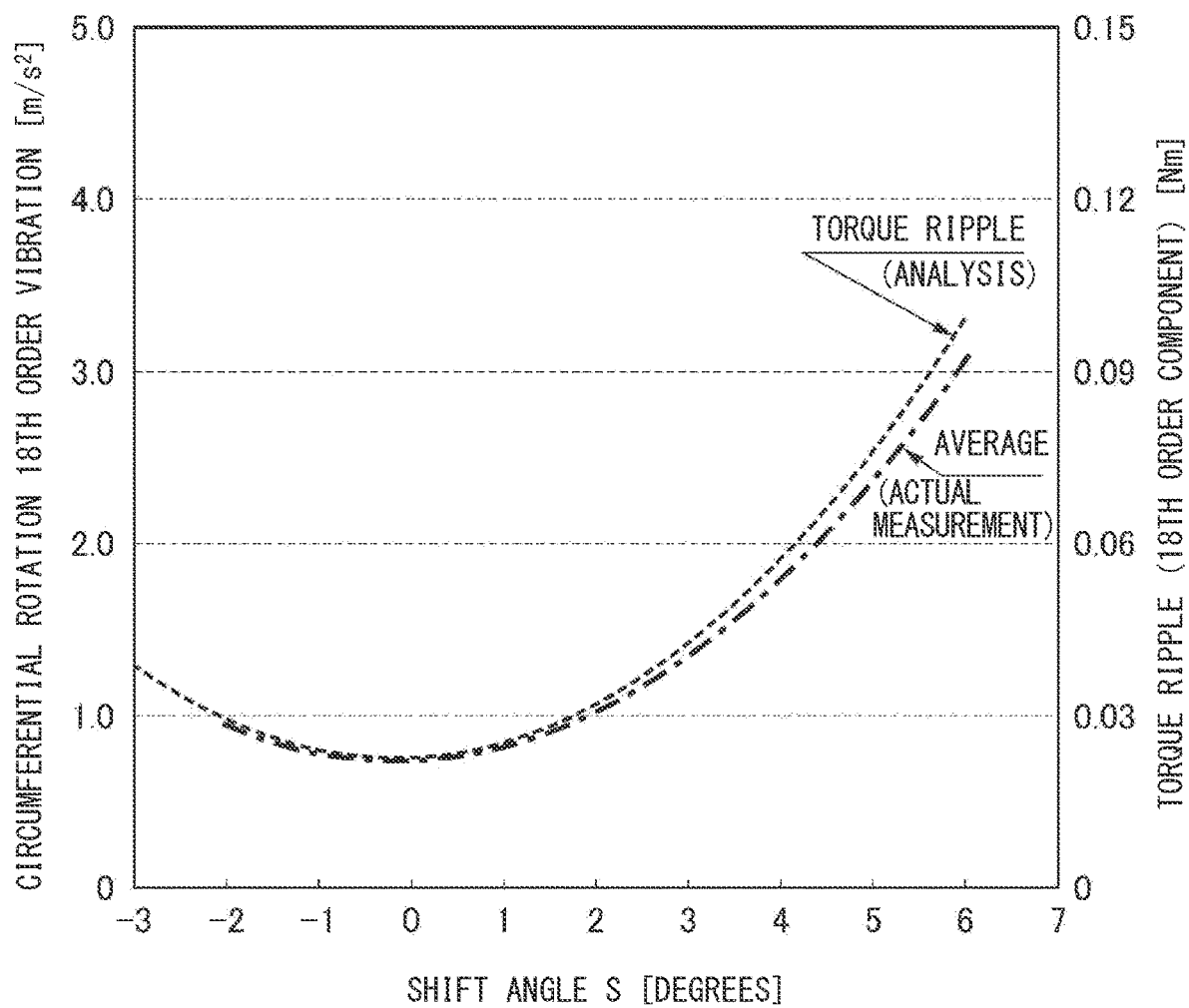
FIG. 6 is a graph showing a relationship between a shift angle and a torque ripple based on a result of analysis.

FIG. 6 is a graph showing a relationship between the shift angle S and the torque ripple based on the result of the analytical simulation. The direct-current motor 10 used in the analysis has the eighteen teeth 22b and the six magnetic poles. Therefore, a vertical axis on the right side of the graph shows an analytical value (Nm) of the torque ripple in the 18th order vibration mode. Furthermore, a vertical axis on the left side of the graph shows an average value of an actual measured value (m/s$^2$) of the 18th order vibration of the direct-current motor 10. The analytical value of the torque ripple and the actual measured value of the 18th order vibration both indicate similar results. Specifically, these values are reduced the most when the shift angle S is set to 0°, and these values are increased when the shift angle S is increased or decreased from 0°.

Figure 7:
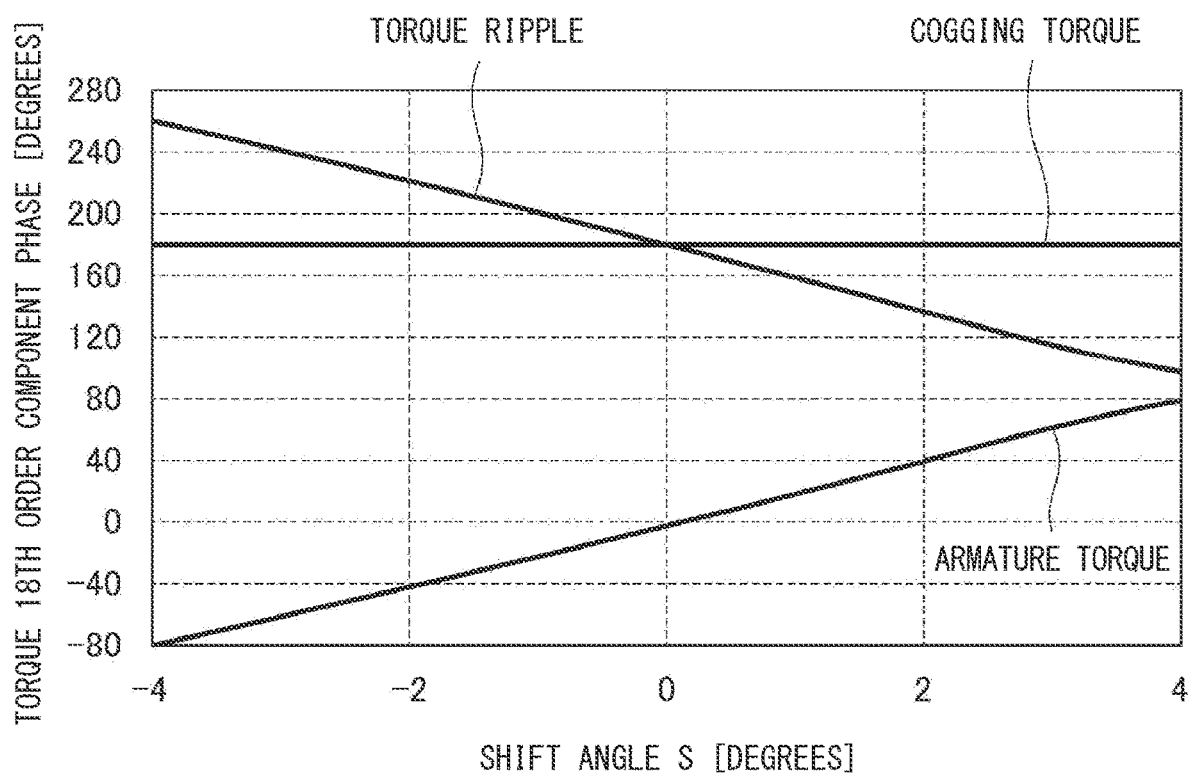
FIG. 7 is a graph showing a relationship between the shift angle and a phase of a torque ripple (a phase of an armature torque and a phase of a cogging torque) based on the result of the analysis.

FIG. 7 is a graph showing a relationship between the shift angle S and the phase of the torque ripple (the phase of the armature torque and the phase of the cogging torque) based on the result of the analytical simulation. It is clearly understood from the graph that in the case where the shift angle S is 0°, i.e., a difference between the phase of the armature torque and the phase of the cogging torque is 180°, the phase of the sine curve of the armature torque and the phase of the sine curve of the cogging torque can be canceled each other at maximum. When the shift angle S is increased or decreased from 0°, the difference between the phase of the armature torque and the phase of the cogging torque is increased or decreased from 180°.

According to the result of the analytical simulation, it is confirmed that in the case where the shift angle S is set to 0°, the torque ripple is most reduced, and thereby the vibration and the noise are reduced. On the other hand, it is common technical knowledge that a reduction in the torque ripple leads to a reduction in the output characteristic of the direct-current motor 10. Therefore, when the output characteristic of the direct-current motor 10 is considered together with the torque ripple, it is desirable that the shift angle S is set in a range of 0°±4°, so that the phase difference falls in a range of 180°±80°. Furthermore, in order to further reduce the vibration and the noise of the direct-current motor 10, it is further desirable that the shift angle S is set in a range of 0°±3°, so that the phase difference falls in a range of 180°±60°.

The present embodiment has been described above with reference to the specific examples. However, the present disclosure is not limited to the above specific examples. Appropriate design changes made by those skilled in the art to the above specific examples are also included in the scope of the present disclosure as long as they have the features of the present disclosure. Each element included in the specific examples described above, and its arrangement, conditions, shape, etc., are not limited to those illustrated and can be changed as appropriate. As long as there is no technical contradiction, the combination of the elements included in the specific examples described above can be changed as appropriate.

What is claimed is:

1. A direct-current motor comprising:
    a rotor that includes:
        a shaft;
        an armature core that has: a plurality of teeth, which are arranged in a circumferential direction about a central axis of the shaft; and a plurality of slots, each of which is formed between corresponding adjacent two of the plurality of teeth; and
        a commutator that has a plurality of segments which are placed adjacent to the armature core and are arranged in the circumferential direction about the central axis;
    a stator that includes a plurality of field magnets which are arranged in the circumferential direction about the central axis, wherein the plurality of field magnets form a plurality of magnetic poles, and each of the plurality of field magnets has corresponding two or more magnetic poles among the plurality of magnetic poles; and
    a brush holder that holds a plurality of power supply brushes which are arranged in the circumferential direction about the central axis, wherein each of the plurality of power supply brushes is configured to contact the plurality of segments, wherein:
    a relationship between a number A of the plurality of slots and a number B of the plurality of magnetic poles is A=n×B where n is a natural number; and
    in a view taken from an output side of the shaft, with reference to the central axis, the direct-current motor is configured as follows:
    a first imaginary line, which radially extends about the central axis through a circumferential center of one of the plurality of teeth, and a second imaginary line, which radially extends about the central axis through a circumferential center of an undercut located between corresponding adjacent two of the plurality of segments placed adjacent to the one of the plurality of teeth, intersect each other at an angle C;
    a third imaginary line, which radially extends about the central axis through a magnetic-flux-free region of one of the plurality of field magnets, and a fourth imaginary line, which radially extends about the central axis through a circumferential center of one of the plurality of power supply brushes placed adjacent to the third imaginary line, intersect each other at an angle D;
    the third imaginary line and a fifth imaginary line, which radially extends about the central axis through a circumferential center of one of the corresponding two or more magnetic poles of the one of the plurality of field magnets, intersect each other at an angle E;
    a reference line of the stator, which radially extends about the central axis, and a sixth imaginary line, which radially extends about the central axis through a reference point of an assembling position of the brush holder for assembling the brush holder to the stator, intersect each other at an angle F; and
    a shift angle S, which is obtained by the angle C+the angle D−the angle E+the angle F, is set to result in that a phase difference between an armature torque and a cogging torque is in a range of 180°±80°.

2. The direct-current motor according to claim 1, wherein the shift angle S is set to result in that the phase difference is in a range of 180°±60°.

3. The direct-current motor according to claim 2, wherein: the angle C is in a range of 0°±3°; the angle D is in a range of 30°±3°; the angle E is in a range of 30°±3°; the angle F is in a range of 0°±3°; and the shift angle S is in a range of 0°±3°.

4. The direct-current motor according to claim 1, wherein in a case where the number B of the plurality of magnetic poles is six, and the natural number is three, each of a plurality of windings is wound around each corresponding set of three teeth among the plurality of teeth at equal intervals of 120° and thereby forms three coils.

5. The direct-current motor according to claim 1, wherein the direct-current motor is used at a control brake.

\* \* \* \* \*